(12) United States Patent
Choi et al.

(10) Patent No.: US 12,040,833 B2
(45) Date of Patent: Jul. 16, 2024

(54) APPARATUS FOR POLARIZATION MULTIPLEXING AND ENCODING IN VISIBLE LIGHT COMMUNICATION SYSTEM BASED ON GOLD NANOPARTICLE

(71) Applicant: Korea Advanced Institute of Science and Technology, Daejeon (KR)

(72) Inventors: Junil Choi, Daejeon (KR); Geonho Han, Daejeon (KR); Hyuckjin Choi, Daejeon (KR); Beomsoo Ko, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 17/578,538

(22) Filed: Jan. 19, 2022

(65) Prior Publication Data

US 2023/0095744 A1 Mar. 30, 2023

(30) Foreign Application Priority Data

Sep. 30, 2021 (KR) .................. 10-2021-0129435

(51) Int. Cl.
*H04B 10/116* (2013.01)
*H04B 10/532* (2013.01)
(Continued)

(52) U.S. Cl.
CPC ......... *H04B 10/116* (2013.01); *H04B 10/532* (2013.01); *H04B 10/6151* (2013.01); *H04J 14/06* (2013.01)

(58) Field of Classification Search
CPC .............. H04B 10/116; H04B 10/532; H04B 10/6151; H04J 14/06
See application file for complete search history.

(56) References Cited

U.S. PATENT DOCUMENTS 10,219,700 B1 * 3/2019 Yang .................... A61B 5/0066
2012/0128374 A1 5/2012 Yang et al.
(Continued)

FOREIGN PATENT DOCUMENTS

| KR | 20080000021 A | 1/2008 |
| KR | 20120057733 A | 6/2012 |
| KR | 101695545 B1 | 1/2017 |

OTHER PUBLICATIONS

English Abstract for KR101695545 B1, Jan. 11, 2017.
(Continued)

*Primary Examiner* — Nathan M Cors
(74) *Attorney, Agent, or Firm* — CAHN & SAMUELS, LLP (57) ABSTRACT

A method and an apparatus for polarization multiplexing and encoding in a visible light communication system based on a gold nanoparticle are provided. A method for encoding in a receiver using a polarizing characteristic in a visible light communication system based on a gold nanoparticle, which is performed by a computer device, includes splitting a receive signal into left circular polarization light and right circular polarization light by allowing the receive signal to pass through a linear polarizer and estimating a phase retardation difference, and detecting a transmit symbol by estimating the phase retardation difference.

5 Claims, 8 Drawing Sheets

(51) Int. Cl.
    *H04B 10/61*         (2013.01)
    *H04J 14/06*         (2006.01)

(56) References Cited

U.S. PATENT DOCUMENTS

| | | | | |
|---|---|---|---|---|
| 2012/0238471 | A1* | 9/2012 | Pinchuk | G01N 21/554 |
| | | | | 977/773 |
| 2017/0016821 | A1* | 1/2017 | Unlu | G01N 21/45 |
| 2017/0116821 | A1* | 4/2017 | Marks | G07F 17/3244 |
| 2020/0217985 | A1* | 7/2020 | Boriskin | G02B 3/0037 |

OTHER PUBLICATIONS

English Abstract for KR20120057733 A, Jun. 7, 2012.
English Abstract for KR200800000021A, Jan. 2, 2008.
Lee, Hye-Eun, et al., "Amino-acid- and peptide-directed synthesis of chiral plasmonic gold nanoparticles", Nature, 556, 360-65 (2018).

* cited by examiner

APPARATUS FOR POLARIZATION MULTIPLEXING AND ENCODING IN VISIBLE LIGHT COMMUNICATION SYSTEM BASED ON GOLD NANOPARTICLE

CROSS-REFERENCE TO RELATED APPLICATIONS

A claim for priority under 35 U.S.C. § 119 is made to Korean Patent Application No. 10-2021-0129435 filed on Sep. 30, 2021, in the Korean Intellectual Property Office, the entire contents of which are hereby incorporated by reference.

BACKGROUND

Embodiments of the inventive concept described herein relate to a method and an apparatus for polarization multiplexing and encoding in a visible light communication system based on a gold nanoparticle and more particularly, relate to a technology for polarization multiplexing and encoding in a visible light communication system based on a gold nanoparticle.

Sixth generation wireless communication is expected to employ terahertz (THz) or a visible light band having a frequency band wider than mmWave to accomplish a higher data rate, as compared to fifth generation wireless communication such that the requirements of various applications are required. Among them, a communication system based on the visible light band spends lower installation costs by employing an existing luminescent diode (LED) or an existing light infrastructure, and increases the security of communication due to straightness which is a physical characteristic of visible light. Although visible light communication (VLC) is mainly made based on an indoor environment, the VLC may be available even in a vehicle environment, because a headlight and a rear light have been already mounted in a vehicle to serve as transmission terminals, and are able to communicate with a streetlight or a traffic light through visible light.

Development has been performed regarding modulation schemes, such as pulse width modulation (PWM), and pulse position modulation (PPM), in addition to intensity modulation (IM) of performing modulation using the intensity of visible light. As a receiver, a non-imaging receiver using a photodiode (PD) or an image receiver including a multiple light diode is present. However, studies and researches have been performed to reduce the correlation between channels using a lens in the imaging receiver.

However, as described above for the visible light communication scheme, only a dimming control scheme is suggested, and a polarization domain scheme is not used. Accordingly, the possibility of eavesdropping by the field of view (FOV) of the visible light of the LED is still present.

Korean Patent Registration No. 10-1695545 discloses a method and an apparatus for visible light communication, capable of providing differential services to a user present in the same space.

PRIOR ARTS

Patent Document

Korean Patent Registration No. 10-1695545

SUMMARY

Embodiments of the inventive concept disclose a method and an apparatus for polarization multiplexing and encoding in a visible light communication system based on a gold nanoparticle, and more particularly, provide a technology of splitting visible light, which is received through a linear polarizer, into left circular polarization light and right circular polarization light and of estimating a phase retardation difference.

Embodiments of the inventive concept disclose a method and an apparatus for polarization multiplexing and encoding in a visible light communication system based on a gold nanoparticle, in which visible light, which is analyzed in a polarization domain, may increase a bit error rate (BER) between a legitimate receiver and an eavesdropper through encoding scheme based on gold nanoparticles (GNP), such that visible light communication preventing wiretapping is accomplished.

According to an exemplary embodiment, a method for encoding in a receiver using a polarization characteristic in a visible light communication system based on a gold nanoparticle, which is performed by a computer device, includes splitting a receive signal into left circular polarization light and right circular polarization light by allowing the receive signal to pass through a linear polarizer and estimating a phase retardation difference, and detecting a transmit symbol by estimating the phase retardation difference.

In the estimating of the phase retardation difference, a phase of a signal may be estimated from the intensity of the signal through a single photodiode (PD), when the signal passes through the linear polarizer.

The estimating of the phase retardation difference may include protecting the receive signal from wiretapping by forming a GNP substrate.

In the protecting of the receive signal from wiretapping, when the visible light passes through the GNP, the left circular polarization light and the right circular polarization light of the visible light are attenuated to have mutually different intensities, and relative phase retardation is made.

In the protecting of the receive signal from wiretapping, the receive signal may be protected from wiretapping by increasing the difference in bit error rate (BER) between the legitimate receiver and the eavesdropper through the encoding based on the GNP.

As the signal is encoded through the GNP substrate included in a transmitter and transmitted, the GNP substrate of the receiver may serve as a decoder.

According to an exemplary embodiment, an apparatus for encoding in a receiver using a polarization characteristic in a visible light communication system based on a GNP, may include a phase retardation difference estimator to split a receive signal into left circular polarization light and right circular polarization light by allowing the receive signal to pass through a linear polarizer, and a transmit symbol detector to estimate a phase retardation difference, and to detect a transmit symbol by estimating the phase retardation difference.

The phase retardation difference estimator may estimate a phase of a signal from the intensity of the signal through a single photodiode (PD), when the signal passes through the linear polarizer.

The phase retardation difference estimator may include a GNP substrate to protect the receive signal from wiretapping.

The phase retardation difference estimator may attenuate the left circular polarization light and the right circular polarization light of the visible light to have mutually different intensities and make relative phase retardation, when the visible light passes through the GNP.

The phase retardation difference estimator may protect the receive signal from wiretapping by increasing the difference in bit error rate (BER) between the legitimate receiver and the eavesdropper through the encoding based on the GNP.

As the signal is encoded through the GNP substrate included in a transmitter and transmitted, the GNP substrate of the receiver may serve as a decoder.

According to an exemplary embodiment, a method for encoding in a transmitter using a polarization characteristic in a visible light communication system based on a GNP, which is performed by a computer device, includes polarization-modulating a transmit signal by allowing the transmit signal to pass through a linear polarizer, and encoding the transmit signal, which is polarization-modulated, by forming a GNP substrate.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments will be described with reference to accompanying drawings. The embodiments of the inventive concept may be modified in various forms, and the scope of the inventive concept should not be construed to be limited by the embodiments of the inventive concept described in the following. In addition, the embodiments of the inventive concept are provided to describe the inventive concept for those skilled in the art more completely. The shapes and the sizes of elements in accompanying drawings will be exaggerated for more apparent description.

Embodiments of the inventive concept are to split visible light, which is received through a linear polarizer, into left circular polarization light and right circular polarization light and to estimate a phase retardation difference.

According to embodiments, visible light, which is analyzed in a polarization domain, may increase a bit error rate (BER) between a legitimate receiver and an eavesdropper through encoding based on gold nanoparticles (GNP), such that visible light communication preventing wiretapping is accomplished.

The following description will be made regarding that a characteristic of adjusting polarization of the GNP is utilized to modulate a signal using a polarization domain and to prevent wiretapping. When visible light passes through the GNP, left circular polarization light and right circular polarization light of the visible light are attenuated to have mutually different intensities, and relative phase retardation is made. The relevant material has been never utilized in a visible communication field, and the studies and researches on visible light communication using the polarizing domain are expected to be significantly spotlighted due to the orientation of the sixth generation communication.

First, according to the inventive concept, equations follow the following notations.

First, $\alpha, a, A$ denote a scalar, a column vector, and a matrix, respectively $\angle \alpha$ denotes the angle of $\alpha$, and $\alpha[k]$ and $A[k_1, k_2]$ denote a k-th component of a, and $(k_1, k_2)$-th component of A, respectively. The Euclidean norm of a is expressed as $\|a\|$. $(\cdot)^T$ denotes a transpose, and $\text{diag}(\cdot)$ denotes a diagonal matrix. The Hadamard product of A and B is expressed as $A \odot B$ $\mathcal{N}(\mu, \sigma^2)$ is a complex normal distribution having the mean of $\mu$ and the variance of $\sigma^2$, $\mathbb{R}, \mathbb{C}$ denote a real number set and a complex number set, respectively, and $\mathbb{E}\{\cdot\}$ denotes a mean operation. In addition, 0 and 1 denote an all-zeros vector and an all-ones vector. $[\cdot]$ denotes a descending operation.

Figure 1:
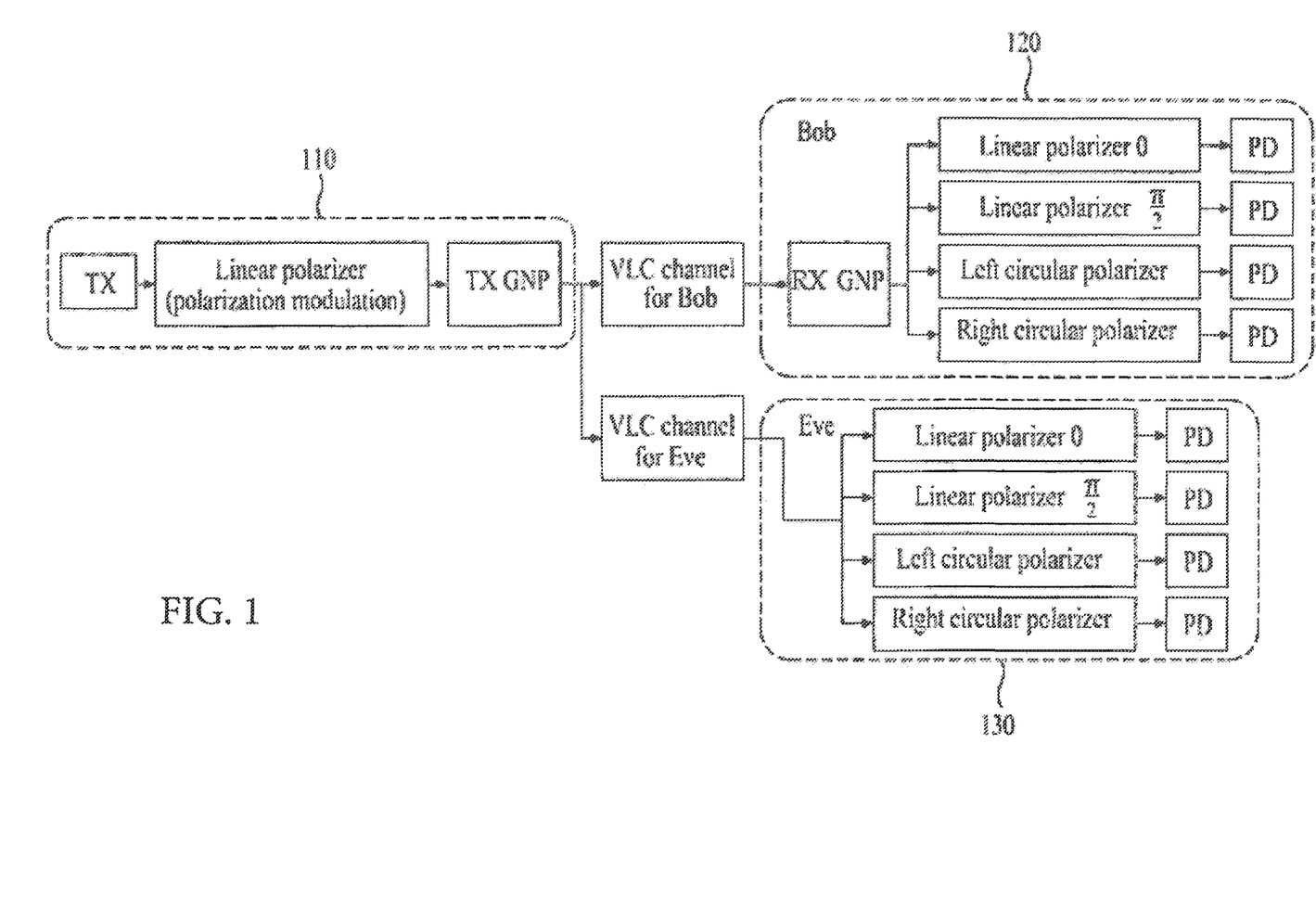
FIG. 1 is a system block diagram of an apparatus for polarization multiplexing and encoding in a visible light communication system based on a GNP, according to an embodiment of the inventive concept.

FIG. 1 is a system block diagram of an apparatus for polarization multiplexing and encoding in a visible light communication system based on a GNP, according to an embodiment of the inventive concept.

Referring to FIG. 1, there suggested a method for multiplexing and encoding based on visible light communication, in which wiretapping is difficult, by using GNP in an indoor environment.

The inventive concept considers a wiretapping situation of a multiple-input multiple-output (MIMO) indoors. In the visible light communication system, an LED and a PD are used as a transmitter and a receiver. The LED may adjust only the intensity of a signal, and the PD may measure only the intensity of the received signal. $N_{TX}$ numbers of transmit (TX) LEDs are mounted at a transmitter 110 together with a TX GNP substrate under an indoor visible communication situation. Bob 120, who is a legitimate receiver, and Eve 130, who is an eavesdropper, receive signals through $N_{Bob}$ number of receive (RX) PDs and $N_{Eve}$ number of RX PDs. The RX GNP substrate is present only for Bob 120.

Regarding signals radiated from an n-th LED, a transformer is derived from a basis vector for a left circular polarization (LCP) and a right circular polarization (RCP) for transformation to left-right CP domains in a Cartesian coordinate system, and applied. In this case, the signals may be expressed as in Equation 1 in a CP domain.

$$x_n(x, y) = \begin{bmatrix} E_x \\ E_y \end{bmatrix} = \alpha \begin{bmatrix} 1 \\ j \end{bmatrix} + \beta \begin{bmatrix} 1 \\ -j \end{bmatrix}, \quad \text{Equation 1}$$

$$x_n(L, R) = \frac{1}{2} \begin{bmatrix} 1 & -j \\ 1 & j \end{bmatrix} \begin{bmatrix} E_x \\ E_y \end{bmatrix} = \begin{bmatrix} \alpha \\ \beta \end{bmatrix}$$

A symbol is modulated in a polarization domain through a linear polarizer having the angle from 0 degree to 90 degrees from a horizontal axis. A signal, which is obtained by dually modulating a symbol using an intensity according to a conventional scheme, may be expressed in a CP domain. The procedure may be expressed as Equation 2.

$$x_n(x, y, 0) = \sqrt{2}\, p_n \begin{bmatrix} 1 \\ 0 \end{bmatrix}, \; x_n(L, R, 0) = \frac{1}{2}\begin{bmatrix} 1 & -j \\ 1 & j \end{bmatrix} x_n(x, y, 0) = p_n \begin{bmatrix} 1/\sqrt{2} \\ 1/\sqrt{2} \end{bmatrix},$$

$$\approx$$

$$x_n\left(x, y, \frac{\pi}{2}\right) = \sqrt{2}\, p_n \begin{bmatrix} 0 \\ 1 \end{bmatrix}, \; x_n\left(L, R, \frac{\pi}{2}\right) = \frac{1}{2}\begin{bmatrix} 1 & -j \\ 1 & j \end{bmatrix} x_n\left(x, y, \frac{\pi}{2}\right) = p_n \begin{bmatrix} -j/\sqrt{2} \\ j/\sqrt{2} \end{bmatrix} \approx p_n \begin{bmatrix} 1/\sqrt{2} \\ 1/\sqrt{2} \end{bmatrix},$$

Equation 2

In this case, $p_n$ denotes an intensity symbol of an n-th LED.

In Equation 2, approximating is possible because the common phase retardation of $$\frac{\pi}{2}$$

is negligibly small due to the high angular frequency of visible light. Therefore, in consideration of the above two polarization states, the signal radiated from the n-th LED in the CP domain may be expressed as Equation 3.

$$x_n^{uni} = \frac{p_n}{\sqrt{2}} \begin{bmatrix} 1 \\ s_n \end{bmatrix} \quad \text{Equation 3}$$

In this case, $s_n$ denotes a polarization symbol and a subscript 'uni' denotes a single wavelength.

White light radiated from the LED has a different signal intensity, depending on a wavelength, which is called relative radiant power. When a signal model of Equation 3 is expanded, a TX signal may be expressed as in Equation 4.

$$x_n = \frac{p_n}{\sqrt{2}} \begin{bmatrix} \sum_{i=1}^{N_\lambda} \mu_i & 0 \\ 0 & \sum_{i=1}^{N_\lambda} \mu_i \end{bmatrix} \begin{bmatrix} 1 \\ s_n \end{bmatrix} \quad \text{Equation 4}$$

In this case, $N_\lambda$ denotes the number obtained by dividing a consecutive visible light spectrum by numerous discrete wavelengths, and $\mu_i$ denotes the relative radiant power of the i-th wavelength.

When the LED follows a Lambertian emission pattern, a VLC geometric channel based on a line-of-sight (LOS) path between an m-th PD and an n-th LED may be expressed as in Equation 5.

$$h_{mn} = \frac{(n_{LED}+1)A_{PD}}{2\pi R_{mn}^2} \cos^{n_{LED}} \phi_{mn} \cos \theta_{mn} \, rect\left(\frac{\theta_{mn}}{FOV}\right) \quad \text{Equation 5}$$

In Equation 5, $$n_{LED} = \frac{-\ln 2}{\ln \cos \Phi_{\frac{1}{2}}}$$

denotes the order of a Lambertian emission, $$\Phi_{\frac{1}{2}}$$

denotes a half-power angle, $A_{PD}$ denotes the area of the PD, $R_{mn}$ denotes the distance between an n-the LED and an m-th PD, and $\phi_{mn}$ and $\theta_{mn}$ denote a radiation angle and an incident angle of the LOS path between the n-th LED and the m-th PD.

rect(x), which is a rectangular function, and indicates that a channel value is not zero only when $\theta_{mn}$ is within the FOV of the PD. The differences between the LCP and the RCP in absorption rate and phase retardation, which are expressed as the characteristic of the GNP in the CP domain for a TX GNP present in the n-th LED, are shown as in Equation 6.

$$G_n = \begin{bmatrix} 1 - a_n^L & 0 \\ 0 & (1 - a_n^R)e^{j\Delta\varphi_n} \end{bmatrix} = \begin{bmatrix} \bar{a}_n^L & 0 \\ 0 & \bar{a}_n^R e^{j\Delta\varphi_n} \end{bmatrix} \quad \text{Equation 6}$$

In this case, $\alpha_n^L$ and $\alpha_n^R$ denote the absorption rates for the LCP and the RCP, and $\Delta\varphi_n$ denotes the relative phase retardation difference between the LCP and the RCP.

Signals incident on the same GNP have different absorption rates and phase retardation differences, depending on the incident angle. Accordingly, it is assumed that signals that pass through the same TX GNP but face different users are affected by mutually different $G_n$, and signals that pass through the same TX GNP and face multiple PDs of one user are affected by the same $G_n$. In addition, it is assumed that the TX GNP and the RX GNP are different types (in concentration or structure of GNP) for each LED and each PD. The assumption for such a GNP provides an optional multiplexing function by increasing the correlation of Eve communication channels (TX GNP passing channel) and decreasing the correlation of Bob communication channels (TX, RX and GNP passing channels).

When the TX signal of Equation 4 passes through a VLC geometric channel of Equation 5 and a TX GNP and an RX GNP of Equation 6 and obtains a receive signal of an m-th PD of Bob, the receive signal of the m-th PD is expressed as Equation 7.

Equation 7

$$y_{B,m} = \begin{bmatrix} y_{B,m}^L \\ y_{B,m}^R \end{bmatrix} =$$

$$a_{res}\rho \sum_{n=1}^{N_{TX}} \begin{bmatrix} \sum_{i=1}^{N_\lambda} \mu_i \bar{a}_{mn,i}^L h_{B,mn} & 0 \\ 0 & \sum_{i=1}^{N_\lambda} \mu_i \bar{a}_{mn,i}^R e^{j\Delta\varphi_{mn,i}} h_{B,mn} \end{bmatrix}$$

$$\begin{bmatrix} p_n/\sqrt{2} & 0 \\ 0 & p_n/\sqrt{2} \end{bmatrix} \begin{bmatrix} 1 \\ s_n \end{bmatrix} + \begin{bmatrix} n_{B,n}^L \\ n_{B,m}^R \end{bmatrix}$$

In this case, $\alpha_{res}$ denotes the responsivity of the PD having the unit of [Amp/Watt], $\rho$ denotes a signal-to-noise ratio (SNR), $\overline{\alpha}_{mn,i}^L$, $\overline{\alpha}_{mn,i}^R$, and $\Delta\varphi_{mn,i}$ denote an LCP transmittance, an RCP transmittance, and a phase retardation difference of the i-th wavelength signal, which are obtained by reflecting a characteristic of a TX GNP present in the n-th LED and a characteristic of an RX GNP present in the m-th PD, and $n_{B,m}^L$ and $n_{B,m}^R$ denote noise in the LCP and the RCP.

The receive signal the m-th PD of Eve may be expressed as Equation 8.

$$y_{B,m} = \begin{bmatrix} y_{B,m}^L \\ y_{B,m}^R \end{bmatrix} = a_{res}\rho \sum_{n=1}^{N_{TX}} \begin{bmatrix} \sum_{i=1}^{N_\lambda} \mu_i \overline{a}_{n,i}^L h_{B,mn} & 0 \\ 0 & \sum_{i=1}^{N_\lambda} \mu_i \overline{a}_{n,i}^R e^{j\Delta\varphi_{n,i}} h_{B,mn} \end{bmatrix}$$

$$\begin{bmatrix} p_n/\sqrt{2} & 0 \\ 0 & p_n/\sqrt{2} \end{bmatrix} \begin{bmatrix} 1 \\ s_n \end{bmatrix} + \begin{bmatrix} n_{B,n}^L \\ n_{B,m}^R \end{bmatrix}$$

Equation 8

In this case, since Eve has no RX GNP, only an influence by the TX GNP is considered, so an LCP transmittance, an RCP transmittance, and a phase retardation difference is expressed using $\overline{\alpha}_{n,i}^L$, $\overline{\alpha}_{n,i}^R$, $\Delta\varphi_{n,i}$.

The receive signal of Bob and the receive signal of Eve, which are expressed with respect to all PDs, may be expressed as Equation 9.

$$y_C = \begin{bmatrix} y_C^L \\ y_C^R \end{bmatrix} = a_{res}\rho \begin{bmatrix} H_C \odot \overline{A}_C^L & 0 \\ 0 & H_C \odot \overline{A}_C^R \end{bmatrix} \begin{bmatrix} P & 0 \\ 0 & P \end{bmatrix} \begin{bmatrix} 1 \\ s \end{bmatrix} + \begin{bmatrix} n_C^L \\ n_C^R \end{bmatrix} =$$

$$a_{res}\rho \tilde{H}_C \tilde{P} x + n_C$$

Equation 9

In this case, $P=\text{diag}([p_1/\sqrt{2}, \ldots, p_{N_{TX}}/\sqrt{2}])$, $s=[s_1, \ldots, s_{N_{TX}}]^T$, $C \in (B, E)$. When $C=B$, $y_B^L=[y_{B,1}^L, \ldots, y_{B,N_{Bob}}^L]^T$, $y_B^R=[y_{B,1}^R, \ldots, y_{B,N_{Bob}}^R]^T$, $H_B[m, n]=h_{B,mn}$, $\overline{A}_B^L[m, n]=\sum_{i=1}^{N_\lambda}\mu_i \overline{\alpha}_{mn,i}^L$, $\overline{A}_B^R[m, n]=\sum_{i=1}^{N_\lambda}\mu_i \overline{\alpha}_{mn,i}^R e^{j\Delta\psi_{mn,i}}$, $n_B^L=[n_{B,1}^L, \ldots, n_{B,N_{Bob}}^L]^T$, $n_B^R=[n_{B,1}^R, \ldots, n_{B,N_{Bob}}^R]^T$.

Figure 2:
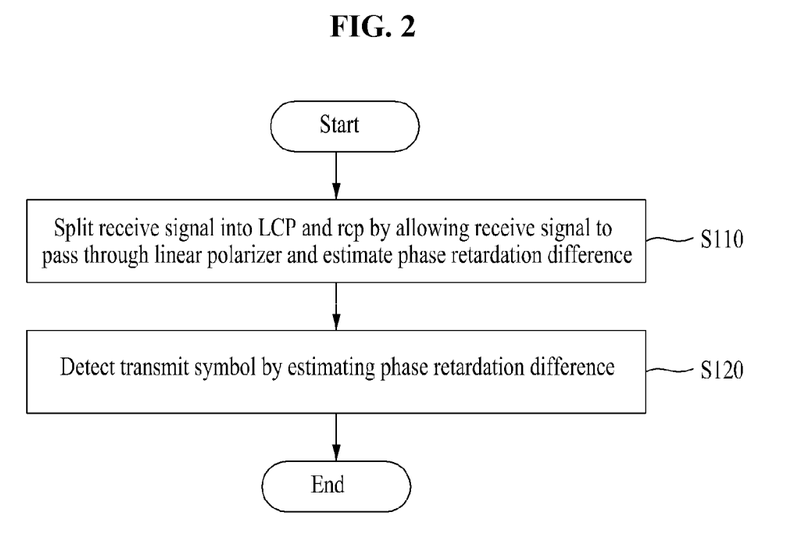
FIG. 2 is a flowchart illustrating a method for encoding in a receiver using a polarization characteristic in a visible light communication system based on the GNP, according to inventive concept.

FIG. 2 is a flowchart illustrating a method for encoding in a receiver using a polarization characteristic in a visible light communication system based on the GNP, according to inventive concept.

Referring to FIG. 2, according to an embodiment, in the method for encoding in the receiver using the polarization characteristic in the visible light communication system based on a GNP, which is executed by a computer device, a receive signal passes through a linear polarizer and is split into a LCP and an RCP and a phase retardation difference is estimated (S110), and a transmit symbol is detected by estimating the phase retardation difference (S120).

According to the inventive concept, the method for encoding in the receiver using the polarization characteristic in the visible light communication system based on GNPs will be described in more detail below while focusing on that the visible light communication system based on the GNP includes the apparatus for polarization multiplexing and encoding.

Figure 3:
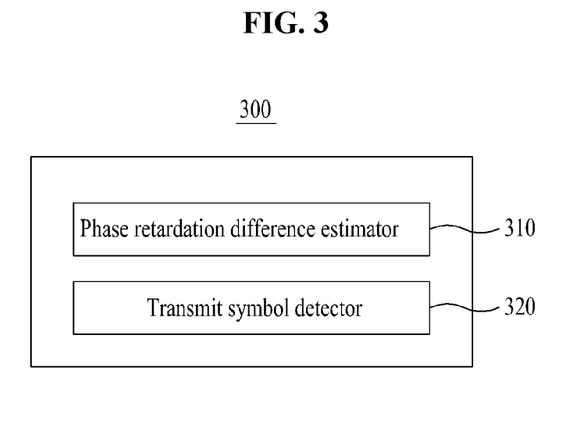
FIG. 3 is a block diagram illustrating an apparatus for encoding in a receiver using a polarization characteristic in a visible light communication system based on the GNP, according to the inventive concept.

FIG. 3 is a block diagram illustrating an apparatus for encoding in a receiver using a polarization characteristic in a visible light communication system based on the GNP, according to the inventive concept.

Referring to FIG. 3, an apparatus 300 for encoding in a receiver using a polarization characteristic in a visible light communication system based on the GNP, according to the inventive concept may include a phase retardation difference estimator 310 and a transmit symbol detector 320.

In S110, the phase retardation difference estimator 310 may allow a receive signal to pass through a linear polarizer, splits the receive signal into a LCP and an RCP, and estimates a phase retardation difference is estimated. The phase retardation difference estimator 310 may estimate the phase of a signal from the intensity of the signal through a single photodiode (PD), when the signal passes through the linear polarizer.

The phase retardation difference estimator 310 may include a GNP substrate to protect the receive signal from wiretapping. In this case, the phase retardation difference estimator 310 may attenuate the intensities of the LCP and the RCP of the visible light to mutually different sizes, when the visible light passes through the GNP, and may cause the relative phase retardation. The phase retardation difference estimator 310 may increase the difference in bit error rate (BER) between the legitimate receiver and the eavesdropper through encoding using the GNP to protect the receive signal from wiretapping.

In S120, the transmit symbol detector 320 may detect a transmit symbol by estimating the phase retardation difference.

According to embodiments, as a signal is encoded through a GNP substrate included in the transmitter and transmitted, a GNP substrate of the receiver may serve as a decoder.

Meanwhile, according to another embodiment, a method for encoding in a transmitter using a polarization characteristic in a visible light communication system based on a GNP, which is executed by a computer device, may include polarization-demodulating a transmit signal by allowing the transmit signal to pass through the linear polarizer, and encoding the transmit signal, which is polarization-demodulated, through a GNP substrate.

First Embodiment: Phase Retardation Difference Estimation

Bob may detect a transmit symbol to make communication using the characteristic of a GNP, when measuring a phase of a receive signal in addition to recognizing information (an absorption rate for a TX GNP and an RX GNP) and a relative phase retardation difference. In other words, in Equation 9, Bob has to estimate the phase of $y_B^R$.

The PD may measure only the intensity of a signal. Accordingly, the PD allows the phase of $y_B^R$ to pass through the linear polarizer to estimate the intensity of the signal. The linear polarizer of an angle of $\varepsilon$ in the CP domain may be induced from the relationship between a Cartesian coordinate system and the CP domain as in Equation 13.

$$L(\varepsilon) = \frac{1}{2}\begin{bmatrix} 1 & e^{-j2\varepsilon} \\ e^{j2\varepsilon} & 1 \end{bmatrix}$$

Equation 13

The receive signal of an m-th PD of Bob is $$y_{B,m} = \begin{bmatrix} y_{B,m}^L \\ y_{B,m}^R \end{bmatrix} = \begin{bmatrix} E_{B,m}^L \\ E_{B,m}^R e^{j\psi_{B,m}} \end{bmatrix},$$

and the LCP component and the RCP component may be expressed in terms of an intensity and a phase ($E_{B,m}^{L}=|y_{B,m}^{L}|$, $E_{B,m}^{R}=|y_{B,m}^{R}|$, $e^{j\psi_{B,m}}=\angle y_{B,m}^{R}$).

Equation 14 expresses a signal obtained, as the m-th receive signal of Bob passes through the linear polarizer of the angle of $\varepsilon_m$ and received, before reaching the PD, and the intensity of the signal.

$$\tilde{y}_{B,m}(\varepsilon_m) = L(\varepsilon_m) y_{B,m} = \frac{1}{2}\begin{bmatrix} 1 & e^{-j2\varepsilon} \\ e^{j2\varepsilon} & 1 \end{bmatrix}\begin{bmatrix} E_{B,m}^{L} \\ E_{B,m}^{R} e^{j\psi_{B,m}} \end{bmatrix} =$$

$$\frac{1}{2}\left(E_{B,m}^{L} + E_{B,m}^{E} e^{j(\psi_{B,m}-2\varepsilon_m)}\right)\begin{bmatrix} 1 \\ e^{j2\varepsilon_m} \end{bmatrix}$$

$$\|\tilde{y}_{B,m}(\varepsilon_m)\| = \sqrt{\frac{\left(E_{B,m}^{L}\right)^2 + \left(E_{B,m}^{R}\right)^2 + 2E_{B,m}^{L}E_{B,m}^{R}\cos(\psi_{B,m}-2\varepsilon_m)}{2}}$$

Equation 14

As expressed as in Equation 14, when the signal passes through the linear polarizer, the phase $\psi_{B,m}$ of the signal may be estimated from the intensity of the signal through the PD. In this case, $\psi_{B,m}$ may be acquired through Equation 15.

$$\psi_{B,m} = \cos^{-1}\left(\frac{2\|\tilde{y}_{B,m}(\varepsilon_m)\|^2 - \left(E_{B,m}^{L}\right)^2 - \left(E_{B,m}^{R}\right)^2}{2E_{B,m}^{L}E_{B,m}^{R}}\right) + 2\varepsilon_m$$

Equation 15

$\cos^{-1}(\cdot)$ does not maintain a sign due to an inverse trigonometric function. Accordingly, the size of $\psi_{B,m}$ is acquired from $\psi_{B,m}$ obtained by setting $\varepsilon_m$ to '0' and the sign of $\psi_{B,m}$ is acquired from $\psi_{B,m}$ obtained by setting $\varepsilon_m$ to $$\frac{\pi}{4}.$$

Second Embodiment: Simulation Result of Suggested VLC Security Communication

According to a second embodiment, the difference in BER between Bob and Eve is proved through simulation under the VLC environment using the GNB by utilizing the phase retardation difference estimating scheme suggested in the first embodiment. In this case, it is assumed that Bob and Eve recognize channel state information (CSI) on $\tilde{H}_B$, and $\tilde{H}_E$.

According to the inventive concept, in the simulation, the number of TX LEDs denotes $N_{TX}=4$, intensity symbol denotes positive real-valued 4-array pulse amplitude modulation (PAM), $$\left\{\frac{1}{5}, \frac{3}{5}, \frac{5}{5}, \frac{7}{5}\right\},$$

polarization symbol $s_n$ indicates $\{-1, 1\}$, and $p_n$ and $s_n$ follow independent uniform distribution. It is assumed that the number of PDs of Bob denotes $N_{Bob}$32 4, and the number of PDs of Eve denotes $N_{Eve}=4$ under the environment without the GNP, and the number of PDs of Bob denotes $N_{Bob}=16$, and the number of PDs of Eve denotes $N_{Eve}=16$ under an environment having the GNP.

Figure 4:
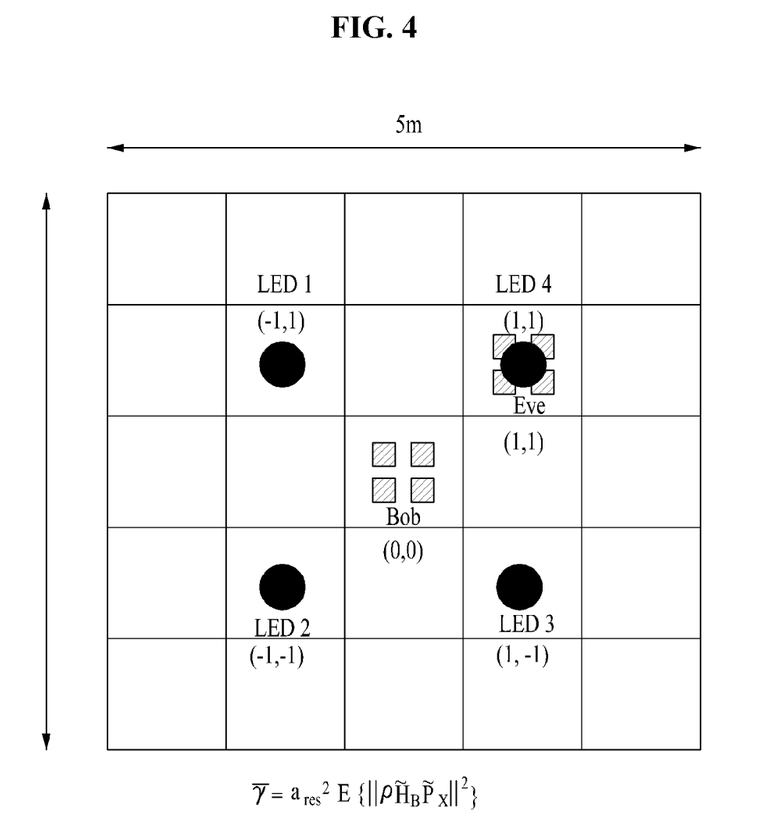
FIG. 4 is a view illustrating the arrangement of a TX LED and the positions of Bob and Eve, according to an embodiment of the inventive concept.

FIG. 4 is a view illustrating the arrangement of a TX LED and the positions of Bob and Eve, according to an embodiment of the inventive concept.

The arrangement of TX LEDs and the positions of Bob and Eve may be expressed as illustrated in FIG. 4. The PD of Bob and the PD of Eve are arranged through a uniform planar array (UPA) scheme while being spaced apart from the distance of 10 cm. The TX LED is positioned at the height of 4 m, and Bob and Eve are positioned at the height of 1. It is assumed that the half-power angle of the LED denotes $$\Phi_{\frac{1}{3}} = \frac{\pi}{3},$$

the area of the PD, the responsivity, and the FOV denote $$A_{PD} = 10^{-4}, a_{res} = 0.54, \text{ and } FOV = \frac{\pi}{2},$$

respectively, and noise follows $$C\mathcal{N}\left(0, \frac{1}{4}\right)$$

because the noise is divided into a real-number part, an imaginary number part, an LCP, and an RCP, In the BER plot of the simulation, an x axis represents an average received SNR, which is $\bar{\gamma}$, of Bob, and is defined as in Equation 16.

$$\bar{\gamma}=\alpha_{res}^2 \, \mathbb{E} \, \{\|\rho\tilde{H}_B\tilde{P}x\|^2\}$$

Equation 16

A symbol detection scheme employs an ML (RZP+ML) detection scheme using a joint maximum likelihood joint (ML) detection scheme and a regularized zero-forcing (RZF) combiner.

Figure 5:
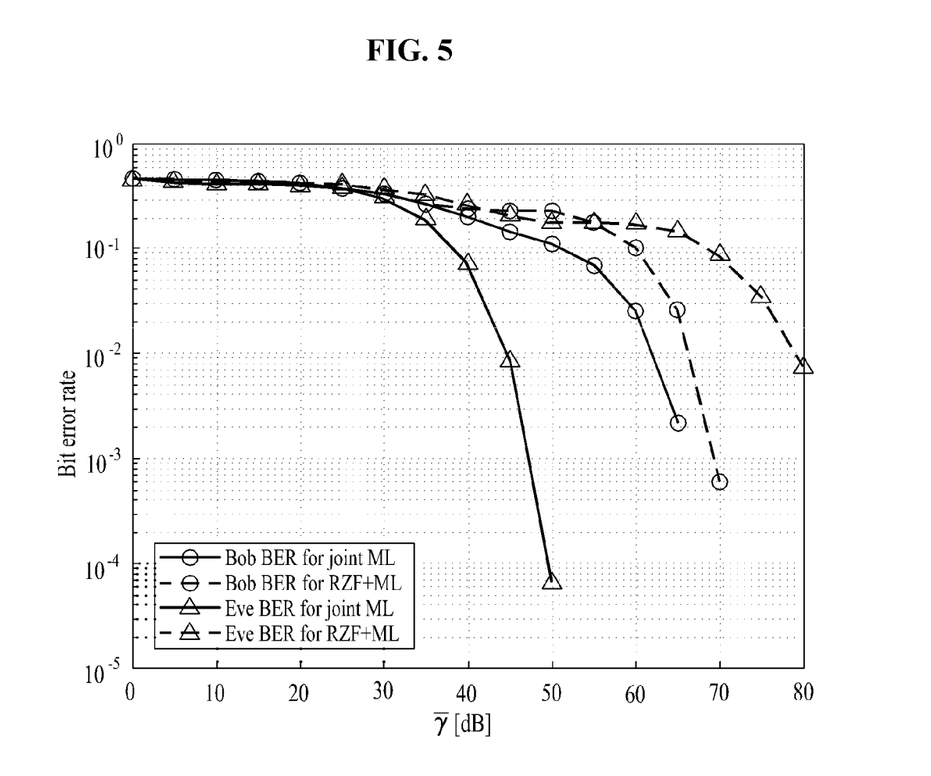
FIG. 5 is a graph illustrating the intensity modulation of a BER under an environment having no GNP, according to an embodiment of the inventive concept.
Figure 6:
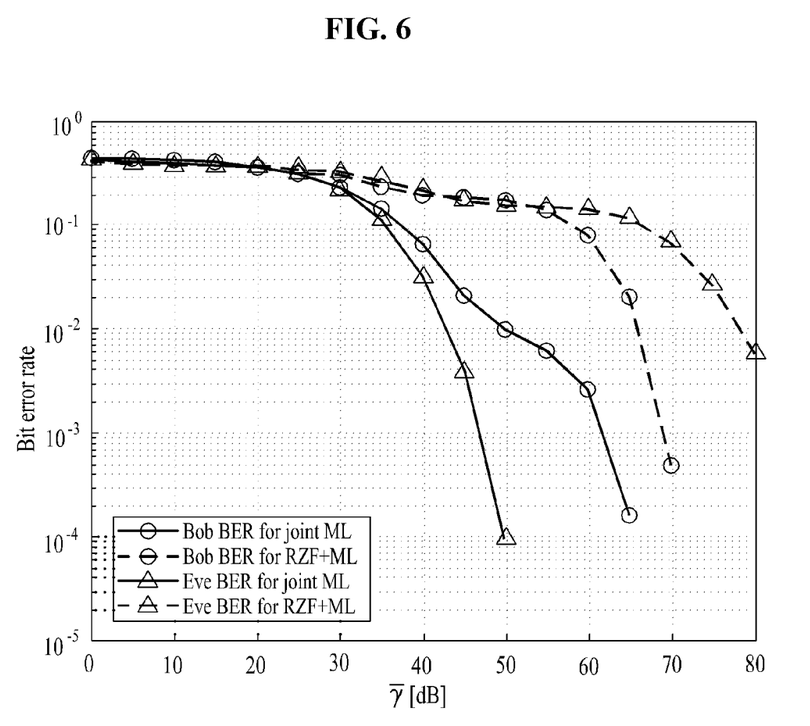
FIG. 6 is a graph illustrating the intensity modulation and the polarization modulation of the BER under an environment having no GNP, according to an embodiment of the inventive concept.

FIG. 5 is a graph illustrating the intensity modulation of a BER under an environment having no GNP, according to an embodiment of the inventive concept, and FIG. 6 is a graph illustrating the intensity modulation and the polarization modulation of the BER under an environment having no GNP, according to an embodiment of the inventive concept.

FIG. 5 illustrates BER plots of Bob and Eve when a symbol is transmitted through intensity modulation under the environment having no GNP. In addition, FIG. 6 is BER plots of Bob and Eve when a symbol is transmitted through intensity modulation and polarization modulation under the environment having no GP. When the symbol is detected through the Joint ML scheme, Bob has a BER greater than that of Eve due to the symmetry of TX LEDs at the position of Bob. Meanwhile, when the symbol is detected through an RZF coupler and an ML scheme, the correlation of $\tilde{H}_E$ is greater than the correlation of $\tilde{H}_B$. Accordingly, a noise enhancement effect is more highly applied to Eve, so the BER of Eve is more increased. Accordingly, there is present the case in which the BER of Eve is less than the BER of Bob depending on the position of Eve under the environment having no GNP.

Figure 7:
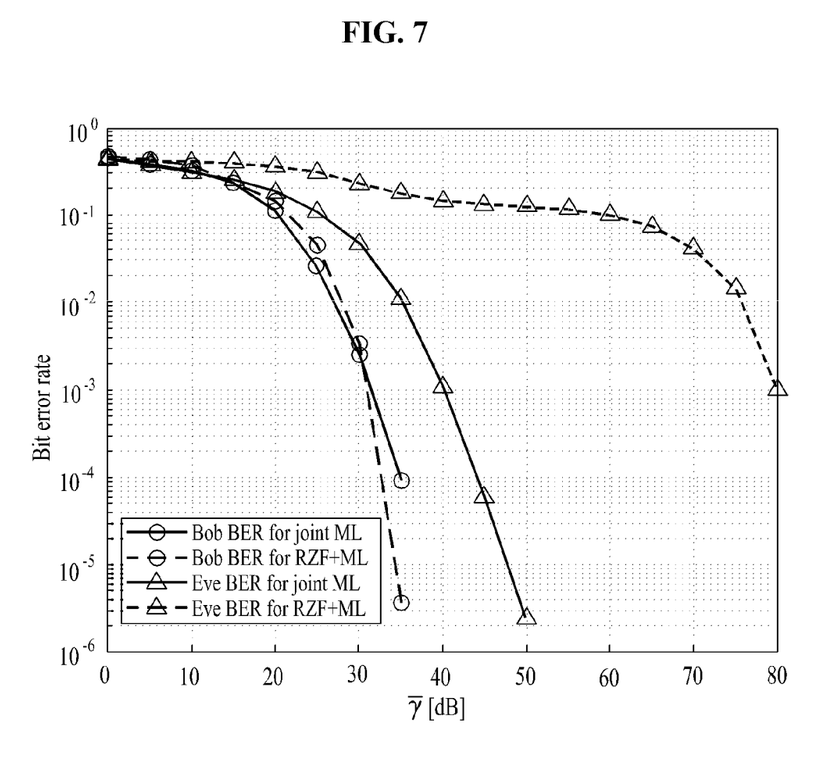
FIG. 7 is a graph illustrating the intensity modulation of a BER, under the environment using a GNP, according to an embodiment of the inventive concept.

FIG. 7 is a graph illustrating the intensity modulation of a BER, under the environment using a GNP, according to an embodiment of the inventive concept.

FIG. 7 is a BER plot obtained when the symbol is transmitted through the intensity modulation, in which the phase retardation difference is estimated for Bob and Eve through a scheme suggested in the first embodiment. When the symbol is detected through the RZF coupler and the ML, $\tilde{H}_E$ represents higher correlation due to the TX GNP producing the encoding effect, and $\tilde{H}_B$ represents lower correlation due to the RX GNP serving as a decoder, so the difference in BER between Eve and Bob is significantly high.

In addition, even if a symbol is detected through the joint ML detection scheme, which is the optimal sensing scheme, for Eve, the BER of Eve may be less than the BER of Bob.

Figure 8:
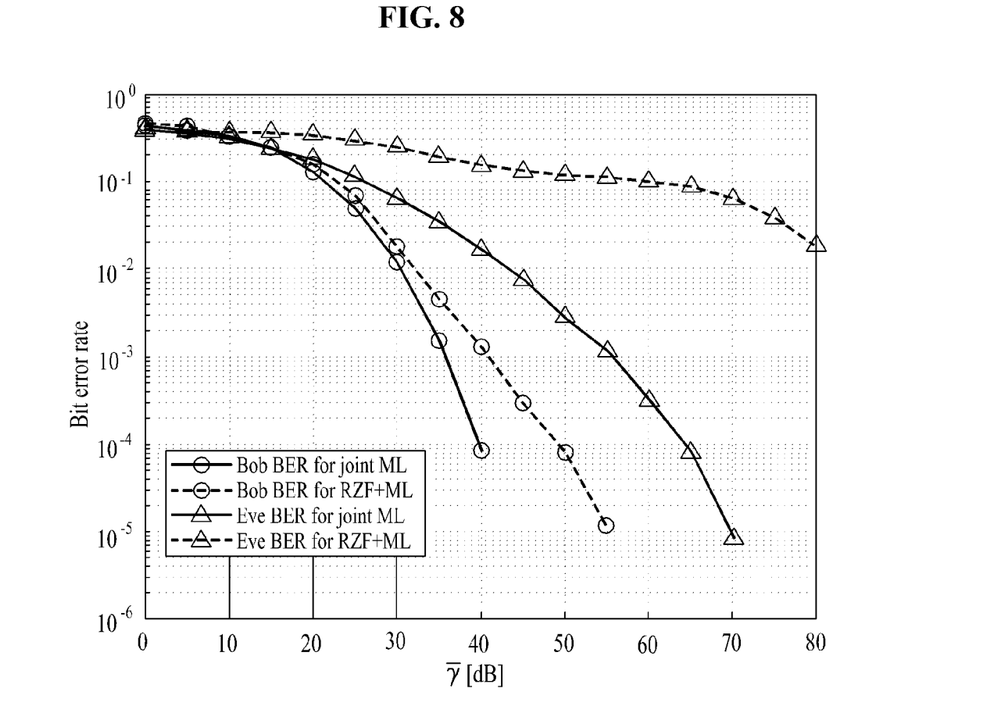
FIG. 8 is a view illustrating BER intensity modulation and polarization modulation even under an environment using a GNP, according to an embodiment of the inventive concept.

FIG. 8 is a view illustrating BER intensity modulation and polarization modulation even under the environment using the GNP, according to an embodiment of the inventive concept.

Referring to FIG. 8, a symbol is transmitted through the intensity modulation scheme and the polarization modulation scheme under the VLC environment using the GNP. It is recognized from FIG. 8 that the difference in BER between Bob and Eve is still present, and the BER of Eve cannot be reduced to less than the BER of Bob.

According to the first embodiment, an error is caused in estimating a phase retardation difference due to an error of an input value into an inverse trigonometric function. In FIG. 7, an error shown in the first embodiment is not made, because an intensity symbol may be detected in an LCP domain. However, in FIG. 8, an influence is exerted by the detection of a polarization symbol due to the relevant error, so the BER is more increased as compared to the case in FIG. 7. However, communication may be made with the larger number of symbols, and an effect, in which the polarization symbols are encoded once more due to the phase retardation difference of the GNP, is produced to exhibit a security enhancement effect.

As described above, embodiments of the inventive concept suggest a scheme of estimating a channel and a phase retardation difference in a polarization domain to accomplish security communication under a VLC environment using a GNP substrate. According to the first embodiment, the phase retardation difference may be estimated by allowing a receive signal to pass through a linear polarizer. According to the second embodiment, a symbol is detected through a scheme suggested in the first embodiment such that the difference in BER is verified through a simulation.

The apparatus described above may be implemented with a hardware component, a software component, and/or the combination of the hardware component and the software component. For example, the apparatus and the component described in embodiments may be implemented with, for example, at least one general computer or special computer, like another apparatus that is able to run a processor, a controller, an arithmetic logic unit (ALU), a digital signal processor, a micro-computer, a field programmable array (FPA), a programmable logic unit (PLU), a micro-processor, or an instruction. A processing unit may run an operating system (OS) and at least one software application executed on the OS. In addition, the processing unit may access, store, manipulate, process, and create data in response to the execution of software. Although one processing device is used for the convenience of explanation, those skilled in the art can understand that the processing device includes a plurality of processing elements and/or a plurality of types of processing elements. For example, the processing apparatus may include a plurality of processors or one processor, and one controller. In addition, another processing configuration, such as a parallel processor, is possible.

Software may include a computer program, a code, an instruction, or the combination with at least one of the components, and may configure the processing unit such that the processing unit desirably operates, or independently or collectively apply an instruction to the processing unit. Software and/or data may be permanently or temporarily embodied in any type of machine, components, physical equipment, virtual equipment, computer storage media or units so as to be interpreted by the processing unit or to provide instructions or data to the processing unit. Software is distributed over a computer system connected to a network, and may be stored or executed through a distribution method. Software and data may be stored on at least one computer readable recording medium.

The method according to the embodiment may be implemented in a program instruction executed through various computer units and may be stored in a computer-readable medium. The computer-readable medium may include a singular form or the combination of a program instruction, a data file, or a data structure. The program instruction recorded in the medium may be specially designed and configured for the embodiments or well-known to a person skilled in a computer filed and used. Examples of computer-readable recording media include magnetic media, such as a hard disk, a floppy disk, and a magnetic tape, optical media, such as a CD-ROM, or a DVD, magnetic-optical media, such as a floppy disk, and a hardware device, such as a ROM, a RAM, a flash memory, that is specially configured to store and execute a program instruction. Examples of a program instruction include a machine language code, such as those created by a compiler, as well as an advanced language code that can be executed by a computer using an interpreter.

As described above, embodiment of the inventive concept may provide a method and an apparatus for polarizing multiplexing and encoding in the visible light communication system based on a gold nanoparticle, in which the visible light, which is received through the linear polarizer, may be split into the left circular polarization light and the right circular polarization light, and a phase retardation difference may be estimated.

Embodiment of the inventive concept may provide a method and an apparatus for polarizing multiplexing and encoding in the visible light communication system based on a gold nanoparticle, in which the visible light, which is analyzed in the polarization domain, may increase a bit error rate (BER) between the legitimate receiver and the eavesdropper through an encoding scheme using gold nanoparticles (GNP), such that visible light communication preventing wiretapping is accomplished.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An apparatus for encoding in a receiver using a polarization characteristic in a visible light communication system based on a gold nanoparticle (GNP), the apparatus comprising:
   a phase retardation difference estimator comprising a GNP and configured to split a receive signal comprising visible light into left circular polarization light and right circular polarization light by allowing the receive signal to pass through a linear polarizer, a left circular polarizer and a right circular polarizer, and to encode the receive signal; and a transmit symbol detector configured to detect a transmit symbol by estimating a phase retardation difference of the left circular polarization light and right circular polarization light, wherein the phase retardation difference estimator estimates a phase of a signal from an intensity of the signal through a number of photodiodes, when the signal passes through a plurality of polarizers.

2. The apparatus of claim 1, wherein the phase retardation difference estimator attenuates the left circular polarization light and the right circular polarization light of the visible light to have mutually different intensities and makes relative phase retardation, when the visible light passes through the GNP.

3. The apparatus of claim 1, wherein the phase retardation difference estimator prevents eavesdropping of the receive signal by increasing a difference in bit error rate (BER) between a legitimate receiver and an eavesdropper through encoding based on the GNP.

4. The apparatus of claim 1, wherein, as a signal is encoded through a GNP substrate included in a transmitter, a GNP substrate of a receiver serves as a decoder.

5. The apparatus of claim 1, wherein the phase retardation difference estimator comprises the GNP, two linear polarizers, a left circular polarizer, and a right circular polarizer.

* * * * *